W. T. WAITE.

PIANO PLAYER MECHANISM.

APPLICATION FILED JUNE 21, 1913.

Reissued Aug. 5, 1913.

13,603.

2 SHEETS—SHEET 1.

Witnesses:
Geo. Davison
Ira J. Wilson

Inventor:
William T. Waite
by Linthicum Belt & Fuller
Attys.

COLUMBIA PLANOGRAPH CO., WASHINGTON, D. C.

W. T. WAITE.

PIANO PLAYER MECHANISM.

APPLICATION FILED JUNE 21, 1913.

Reissued Aug. 5, 1913. 13,603.

2 SHEETS—SHEET 2.

Witnesses:

Geo. C. Davison

Ira J. Wilson

Inventor:

William T. Waite

By Lutkiewicz Belt & Fuller

Att'ys

COLUMBIA PLANOGRAPH CO., WASHINGTON, D. C.

UNITED STATES PATENT OFFICE.

WILLIAM T. WAITE, OF LAPORTE, INDIANA, ASSIGNOR, BY DIRECT AND MESNE ASSIGNMENTS, TO THE ORPHEOLA COMPANY, OF LAPORTE, INDIANA, A CORPORATION OF INDIANA.

PIANO-PLAYER MECHANISM.

13,603. Specification of Reissued Letters Patent. Reissued Aug. 5, 1913.

Original No. 1,028,163, dated June 4, 1912, Serial No. 635,321. Application for reissue filed June 21, 1913. Serial No. 775,151.

*To all whom it may concern:*

Be it known that I, WILLIAM T. WAITE, a citizen of the United States, residing at Laporte, in the county of Laporte and State of Indiana, have invented certain new and useful Improvements in Piano-Player Mechanism, of which the following is a specification.

This invention relates to piano player mechanism, and more especially to the vacuum chest thereof, and has for its object to produce a mechanism of this character which will operate efficiently irrespective of the size of the openings in the note-sheet.

More specifically, my object is to produce means whereby the small volume of air supplied through the note sheet opening and tracker bar is made effective on the diaphragm, before it can escape into the vacuum chest.

Another object is to produce means for preventing the vent or bleed openings becoming clogged with lint and dust.

Another object is to provide adjustable means to effect a quicker or slower response of the primary valves to the raising of the diaphragms.

A still further object is to produce mechanism of this character which can be manufactured and assembled cheaply and which is of simple, strong, and durable construction.

With these and other objects in view the invention consists in certain novel and peculiar features of construction and organization as hereinafter described and claimed; and in order that it may be fully understood reference is to be had to the accompanying drawings, in which—

Figure 1:
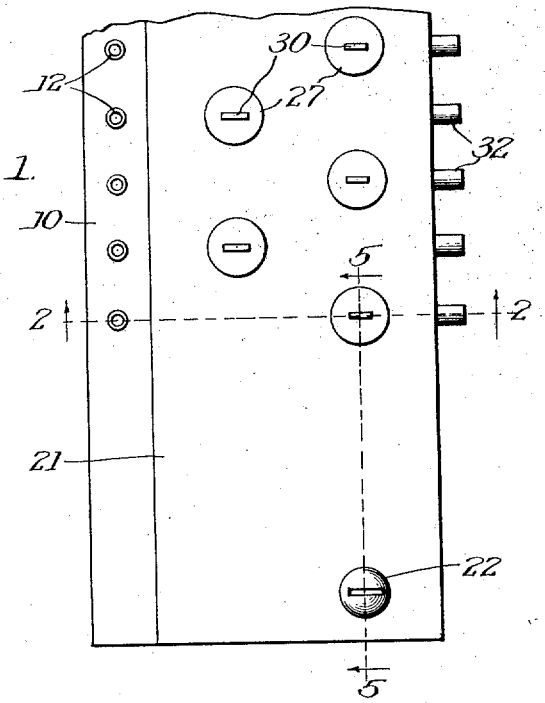
Figure 2:
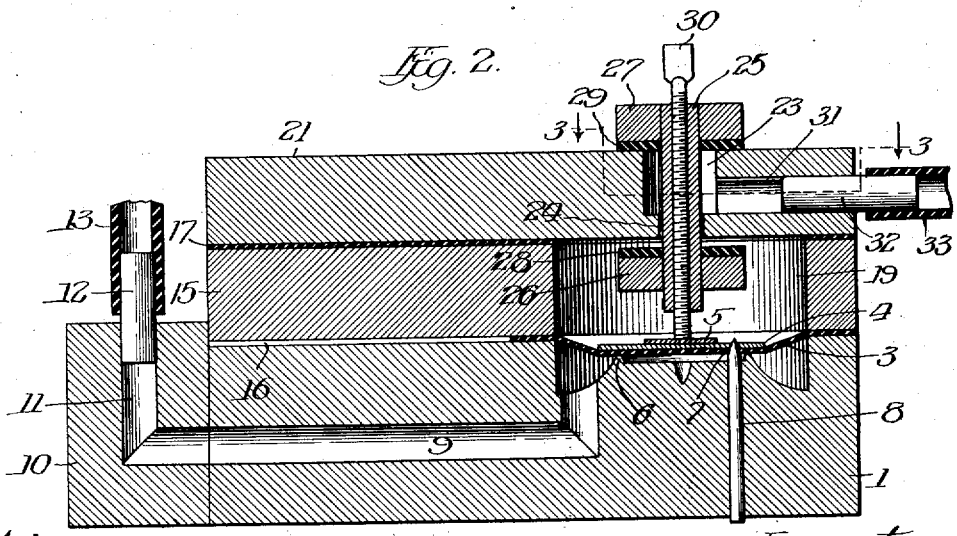
Figure 3:
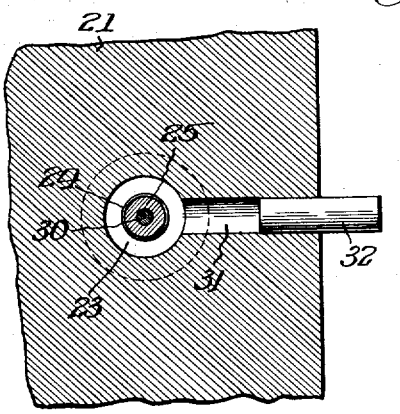
Figure 4:
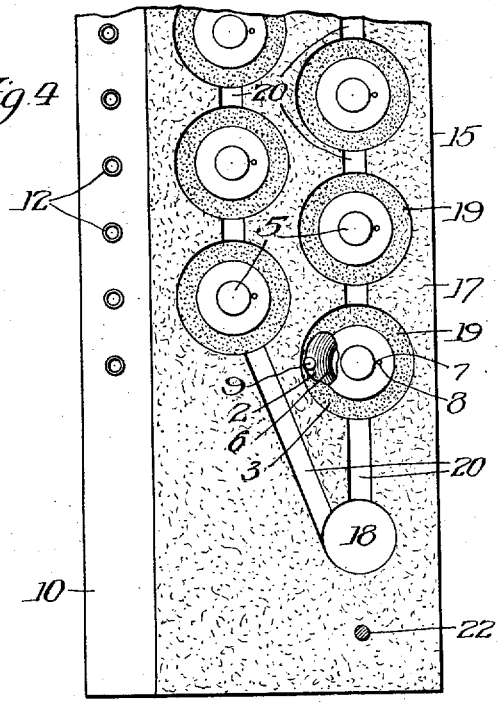
Figure 5:
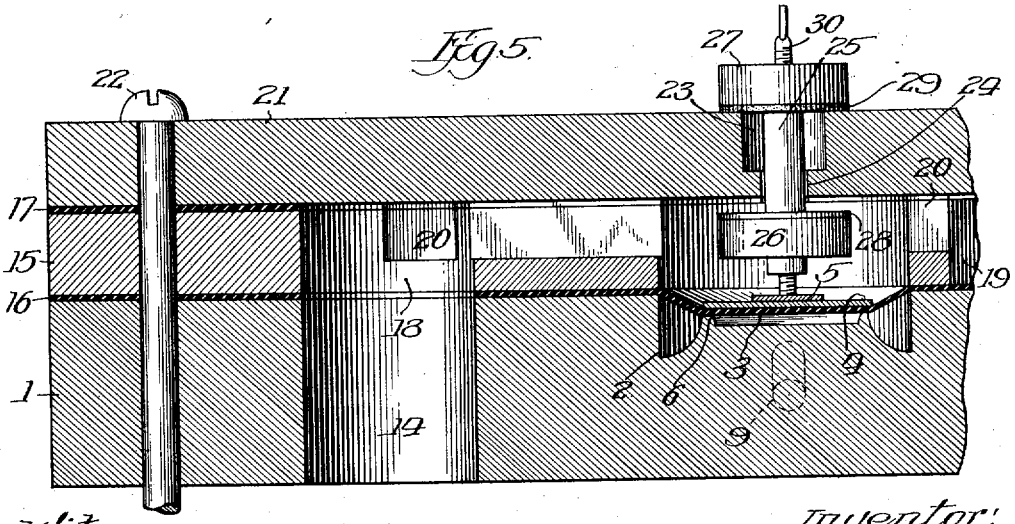

Figure 1, is a plan view of a part of the vacuum chest of a piano player mechanism embodying my invention. Fig. 2, is an enlarged vertical section on the line 2—2 of Fig. 1. Fig. 3, is a section on the line 3—3 of Fig. 2. Fig. 4, is a top plan view of the vacuum chest with upper member thereof omitted. Fig. 5, is an enlarged section on the line 5—5 of Fig. 1.

In the said drawings, 1, indicates the bottom bar of the vacuum chest provided with staggered chambers 2, bridged by suitable flexible diaphragms 3, ordinarily known as the primary diaphragms, and said diaphragms are provided with the customary stiffening disks 4, of smaller diameter than chambers 2, and with wear plates 5, secured upon said disks. The bar is provided centrally of each chamber 2, with an upwardly projecting annular wall 6, upon which the overlying diaphragm normally rests so as to divide said chamber into two normally noncommunicating compartments, one within and the other outward of said wall. Each diaphragm is also provided with a bleed or vent opening 7, part of which preferably extends through the overlying disk 4, and said opening is normally closed by the upwardly-tapering end of a pin 8, which serves to control the passage of air through and prevent the opening being clogged by dust or lint. The bar is also provided with a passage 9 communicating with the compartment of each chamber 2, exterior to the wall 6, and for convenience of connection with the tracker bar, not shown, a strip 10 is secured to the inner edge of bar 1, and is provided with passages 11 in communication with passages 9, short tubes 12 being secured in passages 11 for the attachment of flexible tubes 13 leading from said tracker bar in the customary or any preferred manner, and the bar 1, is also provided with an opening 14, in communication with the customary vacuum-producing mechanism, not shown.

15 is a bar provided at its lower side with a sheepskin or equivalent facing 16, and at its upper side with a similar facing 17, and at a suitable point with an opening 18, in communication with the vacuum opening 14, of bar 1. Bar 15 is also provided in alinement with each chamber 2, with a vacuum chamber 19, which extends through the said facings, and to establish communication between the opening 18 and the chambers 19, channels 20 are provided.

21 indicates the top bar of the vacuum chest, fitting upon bar 15 and bridging the opening, channels and chamber thereof, bolts 22 or equivalent devices, being employed to clamp the bars 1, 15 and 21 rigidly together.

In alinement with each chamber 19, bar 21 is provided with a chamber 23 connected by a passage 24 with the underlying chamber 19, and extending slidingly through each passage 24 without completely filling the same is the stem 25 of a valve, provided at its lower end with a head 26 and at its upper end with a head 27, the former having a compressible facing 28, so that when the valve is raised said head shall effectually close communication between the passage 24 and chamber 19. The head 27 is provided at its lower side with a compressible facing 29, which normally engages the upper side of bar 21, and closes communication between the external atmosphere and the overlying chamber 23, and extending through each valve is a screw 30, which under ordinary conditions, is preferably adjusted so as to rest lightly upon the wear piece 5, of the underlying diaphragm.

The bar 21, is provided with passages 31 leading from chambers 23, and communicating with passages 31 are short tubes 32 which project from the bar for the convenient attachment of flexible tubes 33, leading to the diaphragms (not shown) ordinarily known as the secondary diaphragms or pneumatics, which effect the operation of the hammers, not shown.

Assuming that the parts are in the position shown most clearly in Figs. 2 and 5, it will be apparent that registration of an opening in the note-sheet with an opening in the tracker bar, will result in air passing into the latter, through the connected tube 13, tube 14, passage 11 and passage 9, and into the connected chamber 2 to raise the diaphragm overlying said chamber, and effect the exposure of the bleed opening or vent of such diaphragm, it being noted in this connection that the diaphragm is partially raised before the air in chamber 2 can pass over wall 6 and gain access to the bleed or vent opening, and that for this reason the full volume of air admitted to chamber 2 through the note-sheet and tracker bar is made effective in raising the diaphragm before any of it can escape through the vent opening and that for this reason the diaphragm is extremely sensitive. It is apparent that if the lower end of the set screw of the overlying valve is in contact with the raised diaphragm such valve will likewise start upward before the vent opening is exposed. Under ordinary conditions it is preferable to slightly space the set screws from the diaphragms as with such parts in contact, a pin prick in the paper may result in the production of a false note, whereas if the diaphragm is slightly raised before it engages the set screws, the small volume of air admitted through such pin prick will escape through the vent opening without affecting the valve.

The raising of the valve enables exterior air to enter chamber 23 at its upper end, which air passes from such chamber through passage 31, tubes 32 and 33, to the secondary diaphragm or pneumatic whereby the hammer is caused to strike the key or string of the piano and produce the desired sound. The complete raising of the diaphragm also results in causing the lower head of the valve to close communication between the vacuum chamber and chamber 23 by the way of the connecting passage 24, and at this time the bleed or vent opening is completely opened so that the closure of the tracker bar opening by the note sheet, permits the air below the diaphragm to be evacuated through the vacuum chamber, leaving the diaphragm in equilibrium. At the same time atmospheric pressure depresses the valve and through the same, the diaphragm, so that the latter is in position to instantly repeat for the purpose of effecting a second action of the hammer.

From the above description it will be apparent that the mechanism is extremely sensitive because the air from the tracker bar cannot bleed or vent through opening 7 until the blow is in progress, as distinguished from analogous mechanism in which the venting of the air begins the instant it is admitted by the tracker bar. By my arrangement an opening pricked by a pin in the note sheet, will admit sufficient air to effect the proper operation of the mechanism, because, as hereinbefore explained, all of such air is utilized in opening the valve and none of it is vented into the vacuum chamber until the valve has been raised sufficiently to admit the necessary air into chamber 23 to effect the operation of the hammer.

With the types of mechanism in common use, a comparatively large note-sheet opening is necessary in order to admit sufficient air to not only raise the diaphragm but also provide for the waste which begins with the admission of air, through the vent or bleed opening.

From the above description it will be apparent that I have produced a piano player mechanism embodying the features of advantage enumerated as desirable, and I wish it to be understood that while I have illustrated and described the preferred embodiment of the invention, I do not desire to be restricted to the exact details of construction shown and described as obvious modifications will suggest themselves to one skilled in the art.

I claim:

1. In a piano player mechanism, a vacuum chest provided with a plurality of vacuum chambers, a corresponding number of chambers opposite the vacuum chambers, provided with walls and a tracker duct or passage for and in communication with each of said last-named chambers, movable diaphragms forming partitions between the said vacuum chambers and said opposite chambers and normally engaging the walls of and subdividing the said opposite chambers into two compartments; each diaphragm having a vent or bleed opening to establish communication between a vacuum chamber and a compartment of one of the said opposite chambers, and means closing said vent or bleed openings when the diaphragms are in normal position and uncovering said openings when the diaphragms are in operative position.

2. In a piano player mechanism, a vacuum chest provided with a plurality of vacuum chambers, a corresponding number of chambers opposite the vacuum chambers, provided with walls and a tracker duct or passage for and in communication with each of said last-named chambers, movable diaphragms forming partitions between the said vacuum chambers and the said opposite chambers and normally engaging the walls of and subdividing the said opposite chambers into two compartments, each diaphragm having a vent or bleed opening to establish communication between a vacuum chamber and a compartment of one of the said opposite chambers, and pins closing the vent or bleed openings when the diaphragms are in normal position and uncovering said openings when the diaphragms are in operative position.

3. In a piano player mechanism, a vacuum chest provided with a plurality of vacuum chambers, a corresponding number of chambers opposite the vacuum chambers, provided with walls and a tracker duct or passage for and in communication with each of said last-named chambers, movable diaphragms forming partitions between the said vacuum chambers and the said opposite chambers and normally engaging the walls of and subdividing the said opposite chambers into two compartments, each diaphragm having a vent or bleed opening to establish communication between a vacuum chamber and a compartment of one of the said opposite chambers, and a pin fitting in the vent or bleed opening of each diaphragm when the same is in normal position and withdrawn from said opening when the diaphragm is in operative position.

4. In a piano player mechanism, a vacuum chest provided with a plurality of vacuum chambers, a corresponding number of chambers opposite the vacuum chambers, provided with walls and a tracker duct or passage for and in communication with each of said last-named chambers, movable diaphragms forming partitions between the said vacuum chambers and the said opposite chambers and normally engaging the walls of and subdividing the said opposite chambers into two compartments, each diaphragm having a vent or bleed opening to establish communication between a vacuum chamber and a compartment of one of said opposite chambers, and a pin provided with a tapered end fitting in and closing each vent or bleed opening when the diaphragm thereof is in normal position and withdrawn from said opening when the said diaphragm is in operative position.

5. In a piano player mechanism, a vacuum chest provided with a plurality of vacuum chambers, a corresponding number of chambers above and a similar number of chambers below the vacuum chambers, a tracker duct or passage for and in communication with each of said last-named chambers, a diaphragm dividing the vacuum chambers from the underlying chambers, and when depressed engaging the chest to divide each of the last-named chambers into two compartments; each diaphragm having a vent or bleed opening to establish communication between each vacuum chamber and a compartment of one of the subdivided chambers, means closing the vent or bleed openings when the diaphragms are depressed and uncovering said openings when the diaphragms are raised, passages connecting the vacuum chambers and the overlying chambers, a series of valves corresponding in number to and adapted to be raised by the diaphragms, and consisting of stems extending from the vacuum chambers through said passages and the said overlying chambers, heads within the vacuum chambers and heads at the opposite ends of the stems normally closing communication between the atmosphere and the said overlying chambers, the vacuum chest also having passages connected with the said overlying chambers to receive air from the latter when the valve is raised to close communication between the said chambers and the vacuum chambers and open communication between the said overlying chambers and the atmosphere.

6. In a piano player mechanism, a vacuum chest provided with a plurality of vacuum chambers, a corresponding number of chambers above and a similar number of chambers below the vacuum chambers, a tracker duct or passage for and in communication with each of said last-named chambers, a diaphragm dividing the vacuum chambers from the underlying chambers, and when depressed engaging the chest to divide each of the last-named chambers into two compartments, each diaphragm having a vent or bleed opening to establish communication between each vacuum chamber and a compartment of one of the subdivided chambers, means closing the vent or bleed openings when the diaphragms are depressed and uncovering said openings when the diaphragms are raised, passages connecting the vacuum chambers and the overlying chambers, a series of valves corresponding in number to and adapted to be raised by the diaphragm, and consisting of stems extending from the vacuum chambers through said passages and the said overlying chambers, heads within the vacuum chambers and heads at the opposite ends of the stems normally closing communication between the atmosphere and the said overlying members, the vacuum chest also having passages connected with the said overlying chambers to receive air from the latter when the valve is raised to close communication between the said chambers and the vacuum chambers and open communication between the said overlying chambers and the atmosphere, devices independently adjustable for increasing or decreasing the sensitiveness of the mechanism by causing the valves to start upward as the diaphragm starts to rise or in the interim between the beginning and ending of the upward movement of the diaphragm.

7. In a piano player mechanism, a vacuum chest provided with a plurality of vacuum chambers, a corresponding number of chambers above and a similar number of chambers below the vacuum chambers, a tracker duct or passage for and in communication with each of said last-named chambers, a diaphragm dividing the vacuum chambers from the underlying chambers, and when depressed engaging the chest to divide each of the last-named chambers into two compartments; each diaphragm having a vent or bleed opening to establish communication between each vacuum chamber and a compartment of one of the subdivided chambers, means closing the vent or bleed openings when the diaphragms are depressed and uncovering said openings when the diaphragms are raised, passages connecting the vacuum chambers and the overlying chambers, a series of valves corresponding in number to and adapted to be raised by the diaphragms and consisting of stems extending from the vacuum chambers through said passages and said overlying chambers, heads within the vacuum chambers and heads at the opposite ends of the stems normally closing communication between the atmosphere and the said overlying chambers, the vacuum chest also having passages connected with the said overlying chambers to receive air from the latter when the valve is raised to close communication between the said chambers and the vacuum chambers and open communication between the said overlying chambers and the atmosphere and screws extending through the stems of the valves and adapted to rest upon the underlying diaphragms or be spaced therefrom.

8. A piano player mechanism, including a vacuum chest, comprising a plurality of chambers divided by flexible diaphragms into upper and lower chambers, said diaphragms being provided with bleed openings, and means positioned to close said openings when the diaphragms are in normal lowered position and uncover the openings when the diaphragms are in elevated position.

9. A piano player mechanism, comprising a chamber divided transversely by a perforate diaphragm, and a stationary device projecting through the perforation in said diaphragm to close said perforation when the diaphragm is in lowered position and permit the passage of air through said perforation when the diaphragm is in elevated position.

10. A piano player mechanism, comprising an upper chamber, a lower chamber, a perforate diaphragm separating said chambers, and a tapered pin projecting through the perforation in said diaphragm to close said perforation and preclude the passage of air therethrough when the diaphragm is in lowered position, the tapered formation of said pin permitting the passage of air through the perforation when the diaphragm is in elevated position.

11. A piano player mechanism, comprising a pair of oppositely disposed chambers, a perforate diaphragm separating said chambers, stationary means adapted to close said perforation when the diaphragm is in lowered position and to permit the passage of air through said perforation when the diaphragm is in elevated position, and means for separating said diaphragm in its lowered position.

WILLIAM T. WAITE.

Witnesses:
H. V. McLaughlin,
Robert H. Wendt.

Copies of this patent may be obtained for five cents each, by addressing the "Commissioner of Patents, Washington, D. C."